United States Patent [19]
Takagawa et al.

[11] Patent Number: 6,161,124
[45] Date of Patent: Dec. 12, 2000

[54] METHOD AND SYSTEM FOR PREPARING AND REGISTERING HOMEPAGES, INTERACTIVE INPUT APPARATUS FOR MULTIMEDIA INFORMATION, AND RECORDING MEDIUM INCLUDING INTERACTIVE INPUT PROGRAMS OF THE MULTIMEDIA INFORMATION

[75] Inventors: Yuichiro Takagawa; Takeshi Otomo, both of Tokyo; Kenichiro Shimokura, Kitatsuru-gun, all of Japan

[73] Assignee: Nippon Telegraph & Telephone Corporation, Tokyo, Japan

[21] Appl. No.: 08/907,895

[22] Filed: Aug. 11, 1997

[30] Foreign Application Priority Data

Aug. 14, 1996 [JP] Japan .................................. 8-214762

[51] Int. Cl.⁷ .................................. G06F 13/00
[52] U.S. Cl. .................................. 709/203
[58] Field of Search .................................. 709/200, 201, 709/203, 202, 217, 218, 219, 220

[56] References Cited

U.S. PATENT DOCUMENTS

| | | | |
|---|---|---|---|
| 5,761,673 | 6/1998 | Bookman et al. | 709/311 |
| 5,793,972 | 8/1998 | Shane | 709/219 |
| 5,813,006 | 9/1998 | Polnerow et al. | 707/10 |
| 5,813,007 | 9/1998 | Nielsen | 707/10 |
| 5,832,506 | 11/1998 | Kuzma | 707/200 |
| 5,845,299 | 12/1998 | Arora et al. | 707/513 |
| 5,911,145 | 6/1999 | Arora et al. | 707/514 |

OTHER PUBLICATIONS

"Internet Access: Linkstar annouces Site Launcher", Edge, v7, n10, p. 10(1), Mar. 4, 1996.
"DeltaPoint's one–minute Web Site", Spangler, Todd, PC Magazine, V15, n9, p. 46(2), May 14, 1996.
"Vendor Internet Strategies", Wong, William, Network VAR, V4, n3, p. 35(5), Mar. 1996.
"A site to behold", Levine, Robin, Publish, V10, n6, p. 69(6), Jun. 1995.
"Web Publishing Made Easier", Byte, Dec. 1995, p. 170, vol. 20, No. 12.

*Primary Examiner*—Moustafa M. Meky
*Attorney, Agent, or Firm*—Finnegan, Henderson, Farabow, Garrett & Dunner, L.L.P.

[57] ABSTRACT

A method for preparing and registering homepages within a system that connects a plurality of user terminals with a server equipped by a service provider comprising the steps at said user terminals: editing and preparing homepages; transmitting the prepared homepage data to above server; and outputting on paper information including said information, after information concerning addresses transmitted from said server is received;
and comprising the steps at said server: receiving said homepage data from said user terminals; storing said homepage data in a recording apparatus; determining information concerning the addresses of the corresponding homepages; and returning said determined information to said user terminals, which have transmitted beforehand said homepage data.

27 Claims, 11 Drawing Sheets

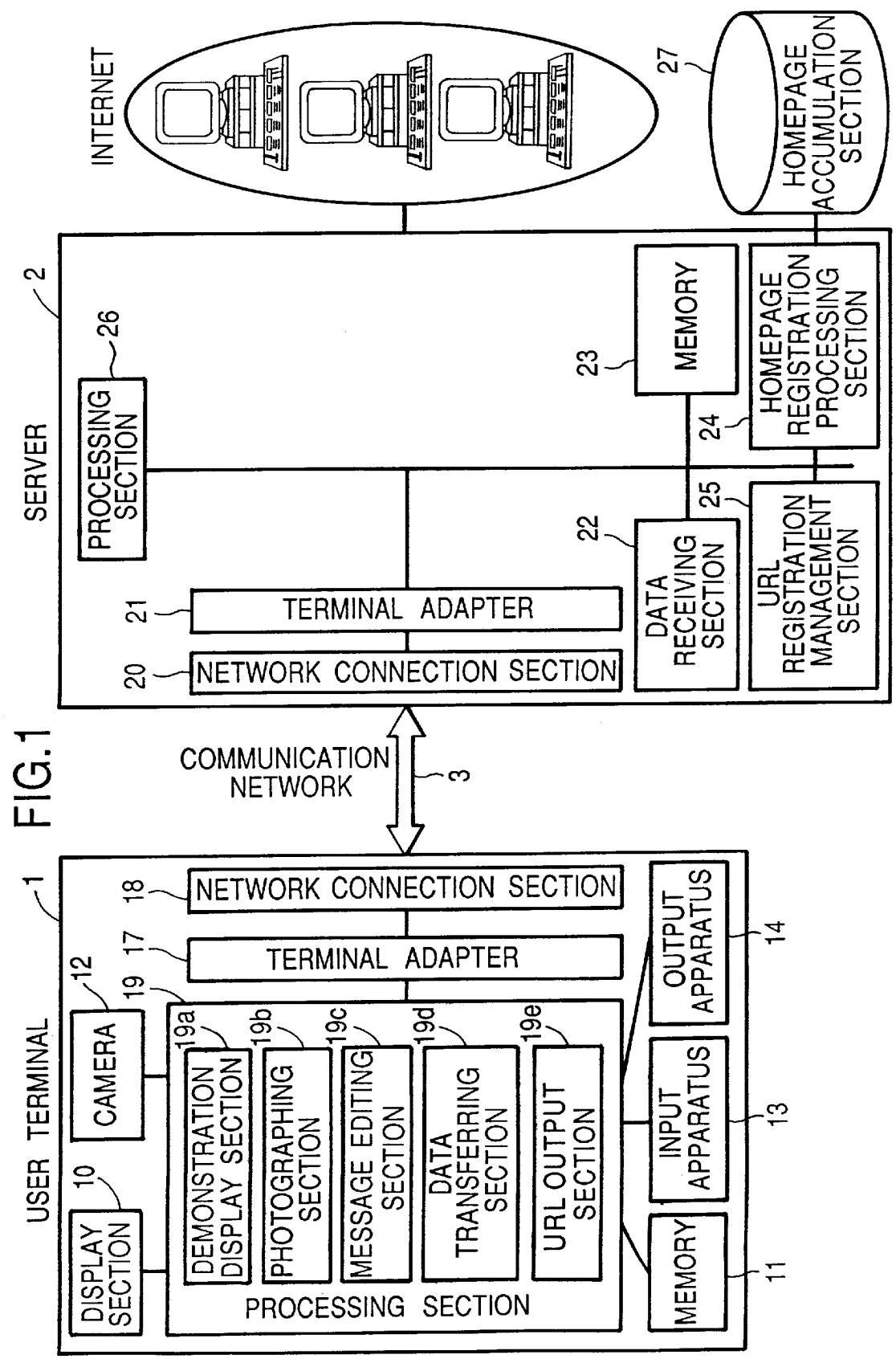

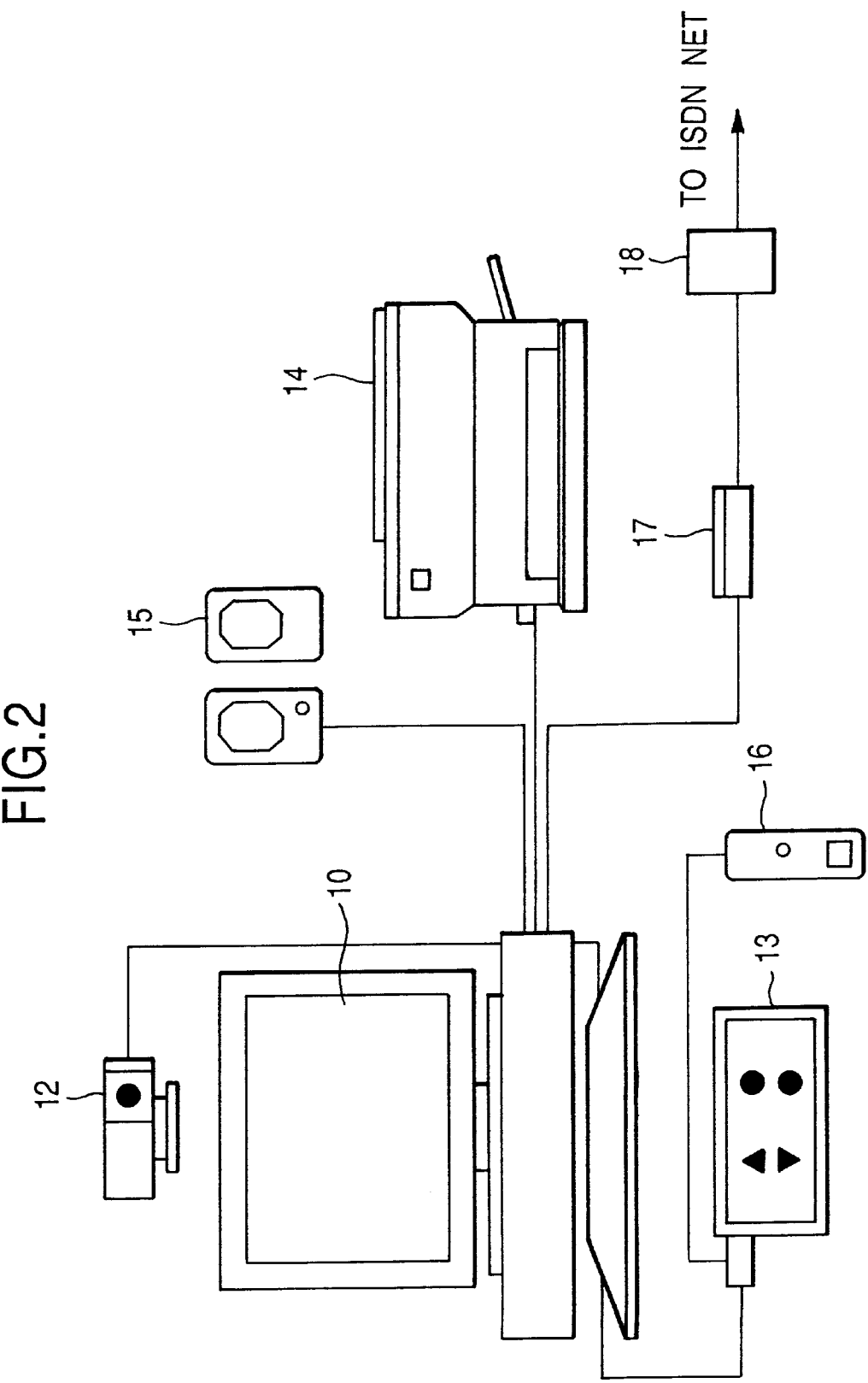

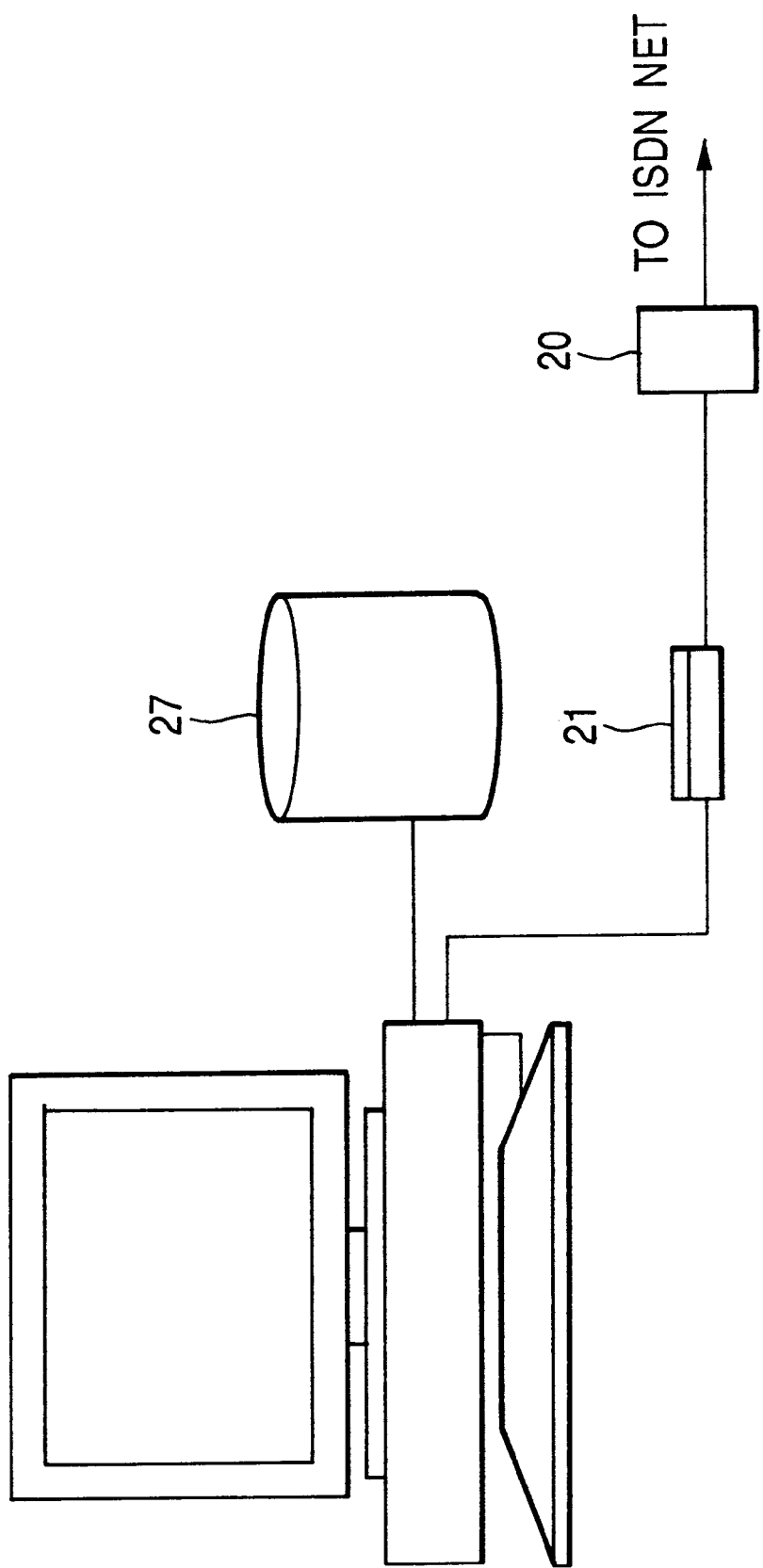

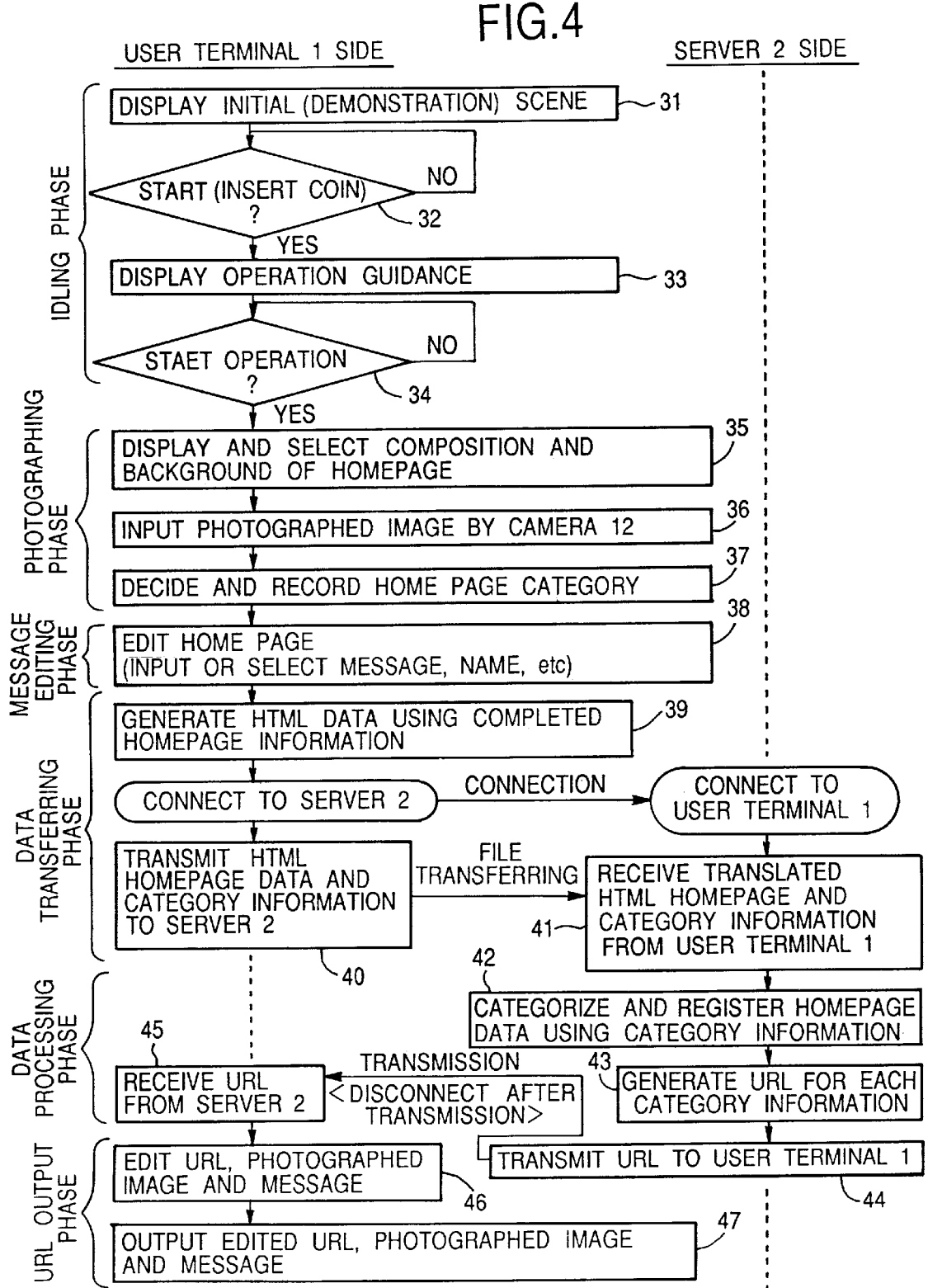

FIG.5 PLEASE SELECT BACKGROUND
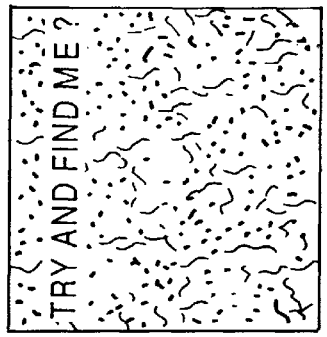
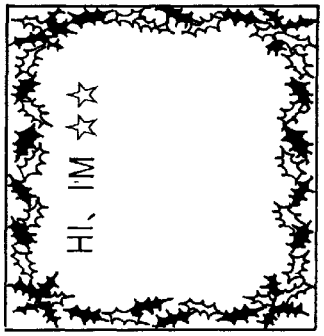
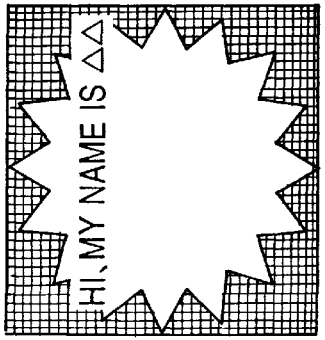
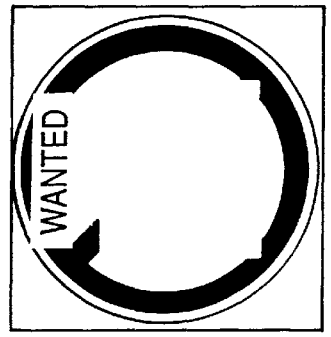
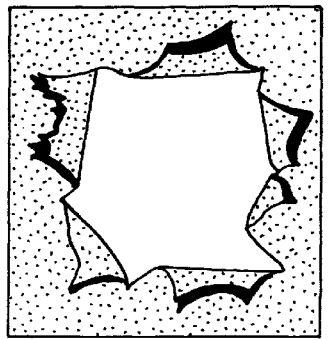

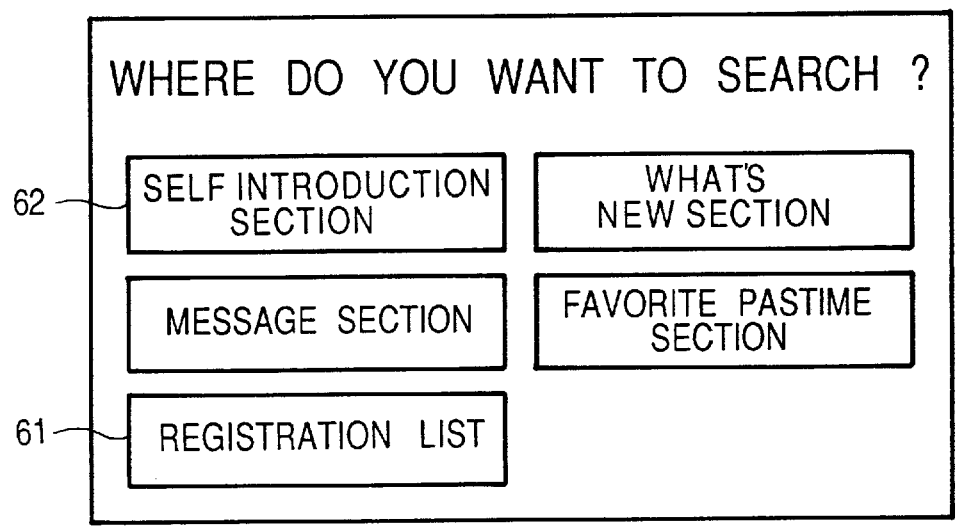

FIG.12

| | NAME | MESSAGE |
|---|---|---|
| 63 — ☐ | ∗∗∗∗ | ∗∗∗∗ |
| ☐ | △△△△ | △△△△ |
| ☐ | ○○○○ | ○○○○ |
| ☐ | ××××  | ×××× |

SELF-INTRODUCTION SECTION

METHOD AND SYSTEM FOR PREPARING AND REGISTERING HOMEPAGES, INTERACTIVE INPUT APPARATUS FOR MULTIMEDIA INFORMATION, AND RECORDING MEDIUM INCLUDING INTERACTIVE INPUT PROGRAMS OF THE MULTIMEDIA INFORMATION

BACKGROUND OF THE INVENTION

1. Technical Field of the Invention

The present invention concerns the method and system for preparing and registering homepages, on a system connecting a plurality of users with a server of a service provider, to prepare homepages at a user terminal and to register the prepared homepages at the server.

2. Background Art

The conventional method of registering homepages on WWW servers (World Wide Web servers) involves either employing a specialized language (HyperText Markup Language; hereinafter abbreviated as HTML) and creating a source code which complies to the syntax of HTML or employing a HTML-specific editor or such and generating a source code using the data created in an environment simulating a word processor. Furthermore, in order to create the source codes, users required personal computers. In addition, it was necessary to connect a line with an Internet service provider, to file-transfer (a process employing the File Transfer Protocol; hereinafter abbreviated as FTP) the completed homepage data to the WWW server, and to request a registration at the provider's homepage.

In the above-mentioned conventional method, the creation of the homepage data is difficult, and FTP and IP addresses, as well as domain name servers need to be registered, network connections need to be made, and requests for homepage registration need to be submitted to an Internet service provider.

SUMMARY OF THE INVENTION

The purpose of the present invention is to offer a method and system for preparing and registering homepages, an interactive input apparatus for multimedia informations, and a recording medium including interactive input programs of the multimedia informations, which can allow a convenient execution of the series of procedures from the preparing of a homepage to its registration.

Therefore, as a method for preparing and registering homepages within a system that connects a plurality of user terminals with a server equipped by a service provider, the present invention offers a method for preparing and registering homepages, which, at the above user terminals, homepages are edited and prepared, then the prepared homepage data are transmitted to above server, after which information concerning addresses transmitted from the above server is received, and information including the aforesaid information is outputted on paper, and which, at the above server, after receiving the aforesaid homepage data from the above user terminals, the homepage data are stored in a recording apparatus, and then information concerning the addresses of the corresponding homepages are determined, and the determined information is sent back to the user terminals, which have transmitted, beforehand, the aforesaid homepage data.

Therefore, with this method, by utilizing user terminals, users can edit and prepare their own homepages and users are able to setup their own homepages without performing the difficult settings conventionally necessary to setup homepages at a server. Consequently, the series of procedures from the preparation to the registration of the homepages is simplified, and it is possible to offer an environment which allows users easy access and easy setup of their homepages. Moreover, because the information concerning the addresses are included on the paper being outputted, the users themselves who setup their homepages utilizing the user terminals have no need to write down where their homepages are stored, and relaying that information to other people is facilitated.

Furthermore, as a system for preparing and registering homepages that connects a plurality of user terminals with a server equipped on the side of the service provider, the present invention offers a system for preparing and registering homepages, which has the above user terminals provide a means for preparing homepages which allows the editing and preparing of the homepages, a means for transmitting which allows the transmission of the above prepared homepage data to the above server, a means for receiving which allows, after the aforesaid transmission, the receiving of the information concerning the addresses being transmitted by the above server, and a means for outputting which allows the output of the information including the information concerning the above addresses onto paper, and which has the above server provide a means for receiving homepages which allows the receiving of the above homepage data from the above user terminals, a means for registering homepages which allows the storage of the above homepage data inside a recording apparatus, a means for determining which allows the determining of the information concerning the addresses of the above homepages, and a means for returning data which transfers the determined information to the user terminals originally transmitting the above homepage data.

Therefore, with this system, by utilizing user terminals, users can edit and prepare their own homepages and users are able to setup their own homepages without performing the difficult settings conventionally necessary to setup homepages at a server. Consequently, the series of procedures from the preparation to the registration of the homepages is simplified, and it is possible to offer an environment which allows users easy access and easy setup of their homepages. Moreover, because the information concerning the addresses are included on the paper being outputted, the users themselves who setup their homepages utilizing the user terminals have no need to write down where their homepages are stored and relaying that information to other people is facilitated.

In addition, as an interactive input apparatus for multimedia informations connected to a server equipped on the side of the service provider, the present invention offers an interactive input apparatus for multimedia informations which provides a means for preparing homepages which allows the editing and the preparation of the aforesaid homepages in accordance with a prescribed method of operation, a means for transmitting which allows the transmission of the above prepared homepage data to the above server, a means for receiving which allows, after the above transmission, the receiving of the information concerning the addresses transmitted from the above server, and a means for outputting which allows the output of the information including the information concerning the above addresses onto paper.

Therefore, with this apparatus, users can edit and prepare their own homepages and users are able to setup their own homepages without performing the difficult settings conventionally necessary to setup homepages at a server.

Consequently, the series of procedures from the preparation to the registration of the homepages is simplified, and it is possible to offer an environment which allows users easy access and easy setup of their homepages. Moreover, because the information concerning the addresses are included on the paper being outputted, the users themselves who setup their homepages utilizing the user terminals have no need to write down where their homepages are stored and relaying that information to other people is facilitated.

Furthermore, as a computer-readable recording medium being connected to a server on the side of a service provider and including interactive input programs for multimedia informations, for the purpose of registering information concerning the prepared homepages at the aforesaid server, the present invention offers a recording medium, which includes interactive input programs for multimedia informations and which functions as a means for preparing homepages which allows the editing and the preparation of the aforesaid homepages in accordance with a prescribed method of operation, a means for transmitting which allows the transmission of the above prepared homepage data to the above server, a means for receiving which allows, after the above transmission, the receiving of the information concerning the addresses transmitted from the above server, and a means for outputting which allows the output of the information including the information concerning the above addresses onto paper.

Therefore, by executing the program included in this recording medium, users can edit and prepare their own homepages and users are able to setup their own homepages without performing the difficult settings conventionally necessary to setup homepages at a server. Consequently, the series of procedures from the preparation to the registration of the homepages is simplified, and it is possible to offer an environment which allows users easy access and easy setup of their homepages. Moreover, because the information concerning the addresses are included on the paper being outputted, the users themselves who setup their homepages utilizing the user terminals have no need to write down where their homepages are stored and relaying that information to other people is facilitated.

BRIEF DESCRIPTION OF THE DRAWINGS

FIG. 1 is a structural diagram of the system which illustrates an embodiment of the present invention.

FIG. 2 is a structural diagram of the user terminal 1 within FIG. 1.

FIG. 3 is a structural diagram of the server 2 within FIG. 1

FIG. 4 is a flow chart which illustrates an example of the flow of the homepage editing and preparation processes.

FIG. 5 is a diagram which illustrates examples of the homepage background scenes.

FIG. 10 is a diagram which illustrates an example of a Front Page.

FIG. 11 is a diagram which illustrates an example a Top Page which, in this case, is a Registration List Page.

FIG. 12 is a diagram which illustrates an example of a category-based page.

DETAILED DESCRIPTION OF THE PREFERRED EMBODIMENTS

Figure 6:
FIG. 6 is a diagram which illustrates the structure of a homepage.

FIG. 1 is a structure diagram of the system which illustrates an embodiment of the present invention, while FIG. 2 is a structure diagram of the user terminal 1, and FIG. 3 is a structure diagram of the server 2.

The present system is formed by a plurality of user terminals 1 and a server 2 and the communication network 3 connecting the user terminals 1 and the server 2. The user terminals 1 and the server 2 are connected via the ISDN network.

The user terminals 1 provide an interactive input apparatus for multimedia informations formed by a display section 10 which displays information necessary in the editing and preparation of the homepages, a memory 11 which has stored beforehand the structure and the background of the homepages, a camera 12 to input image information of the homepages, an input apparatus 13 which is a pointing device, an output apparatus 14 which is a page printer, speakers 15, a coin insertion slot 16, an ISDN terminal adapter 17, a network connection section 18, and a processing section 19.

The processing section 19 is formed by a demonstration display section 19a which displays, at the display section 10, information necessary in the editing and preparation of the homepages, a photographing section 19b which inputs the image information of the homepages captured by the camera 12, a message editing section 19c which allows the editing and preparation of the homepages using the structure of the homepages stored in the memory 11 and using the image information captured by the camera 12, makes the homepages be WWW-compatible, selects a pattern stored in the memory 11, and determines, from the category information prepared beforehand, a category and stores that information, a data transferring section 19d which transmits the prepared homepage data and the above categories to the server 2 via the ISDN terminal adapter 17 and the network connection section 18, and a URL output section 19e which receives, after the above transmission, the transmitted URL via the network connection section 18 and the ISDN terminal adapter 17 and outputs onto paper at the output apparatus 14, the information based on the received URL and the homepage data.

The server 2 is formed by a network connection section 20, a ISDN terminal adapter 21, a data receiving section 22 which receives the homepage data or categories from the user terminals 1, a memory 23, a homepage registration processing section 24 which classifies the homepage data according to category information and stores the homepage data in the homepage accumulation section 27, a URL registration management section 25 which defines the URL of the homepages, and a processing section 26 which makes the prepared homepages be WWW-compatible, registers, after the URL is defined, the index of the above homepage at a prescribed page, links the index with the stored homepage data, deletes the stored homepage data when a prescribed amount of time passes, after the registration of the homage at a prescribed page, and transmits, via the ISDN terminal adapter 21 and the network connection apparatus 20, the defined URL to the user terminals 1 which transmitted the homepage data.

In the present invention, "category" applies to the partition of the server 2 where the homepages, edited at user terminals 1, are registered. For example, such categories as "Self-Introduction", "What's New?", "Messages", and "Favorite Pastime" are determined beforehand. In addition, "homepage data" applies to the data from the homepage editing and preparation at the user terminals 1 transmitted to the server 2.

FIG. 4 is a flowchart which illustrates an example of the flow of the homepage editing and preparation processes. The homepage editing and preparation processes consist of an idling phase, a photographing phase, a message editing phase, a data transferring phase, a data processing phase, and an URL output phase.

Idling Phase

When the user terminals 1 are idling, the demonstration display section 19a displays the demonstration scene at the display section 10 (step 31). The demonstration scene displays the method of operation, completed homepages, etc. The user is to insert a coin(s) into the coin insertion slot 16 when starting (step 32). Upon the insertion of the coin(s), the message editing section 19c outputs a message, at the display section 10, explaining the important points about how to start preparing a homepage and then displays a simple explanation about the operation (step 33). Next, upon the user's action (the pressing of the "start" button), the process proceeds to the following photographing phase (step 34).

Photographing Phase

The message editing section 19c allows the selection of a composition and a background of the homepage(FIG. 5) from the memory 11 (step 35) and, utilizing the camera 12, conducts photographing according to the photographing section 19b (step 36). The method of selecting a background involves choosing, with an input apparatus 13, a desired background from among the multiple background patterns being displayed, and then pressing the "ok" button. The message editing section 19c determines the category used when viewing the homepage, according to its background, and records the category as category information (step 37), and then proceeds to the following message editing phase.

Message Editing Phase

By inputting a name(s) and a simple message matching with the composition of the homepage through the input apparatus 13, the homepage is completed at the message editing section 19c (step 38). When inputting a name(s), the user selects from a previously registered list of several common names displayed in hiragana, katakana, or the Roman alphabets. In addition, in the case where a name(s) is not registered beforehand, input is made possible by character selection, and then the process proceeds to the data transferring phase.

Data Transferring Phase

The homepage which the message editing section 19c completed is automatically translated into HTML-format (step 39), and generates the data corresponding to a single homepage. FIG. 6 illustrates an example of the structure of a homepage. After appending the category information to the generated homepage, the data transferring section 19d file-transfers the above data to the server2 through the ISDN. Then, the user terminal 1 waits for the URL information that is sent back from the server 2 at the end of the data processing phase, and after receiving the URL information, the process proceeds to the URL output phase.

At the server 2, the homepage registration processing section 24 categorizes, according to category, the homepage data sent to it, and stores the data in the homepage accumulation section 27 (step 41, 42), and the URL registration management section 25 defines the URL for each category and registers the index at the prescribed page of the current service provider, at the same time automatically establishes a link required to access the homepage data from that index (step 43). Lastly, the processes of the server 2 concludes with the transmission of the URL defined at the processing section 26 to the user terminal 1.

URL Output Phase

At the user terminal 1, the URL output section 19e edits and outputs the URL sent from the server 2, the photograph taken earlier, and the inputted message. The URL will be in a sticker-form to be able to affix on business cards and such.

When viewing prepared homepages, links are established from the prescribed pages to each of the informations arranged according to their categories, and based on those links, each of the registered homepages can be accessed.

During step 36 of the photographing phase, in conjunction with the input of the photographic image obtained by the camera 12, voice message input by the use of a microphone not illustrated in FIG. 2 can be performed and can be used as homepage data for the composing a homepage.

Figure 7:
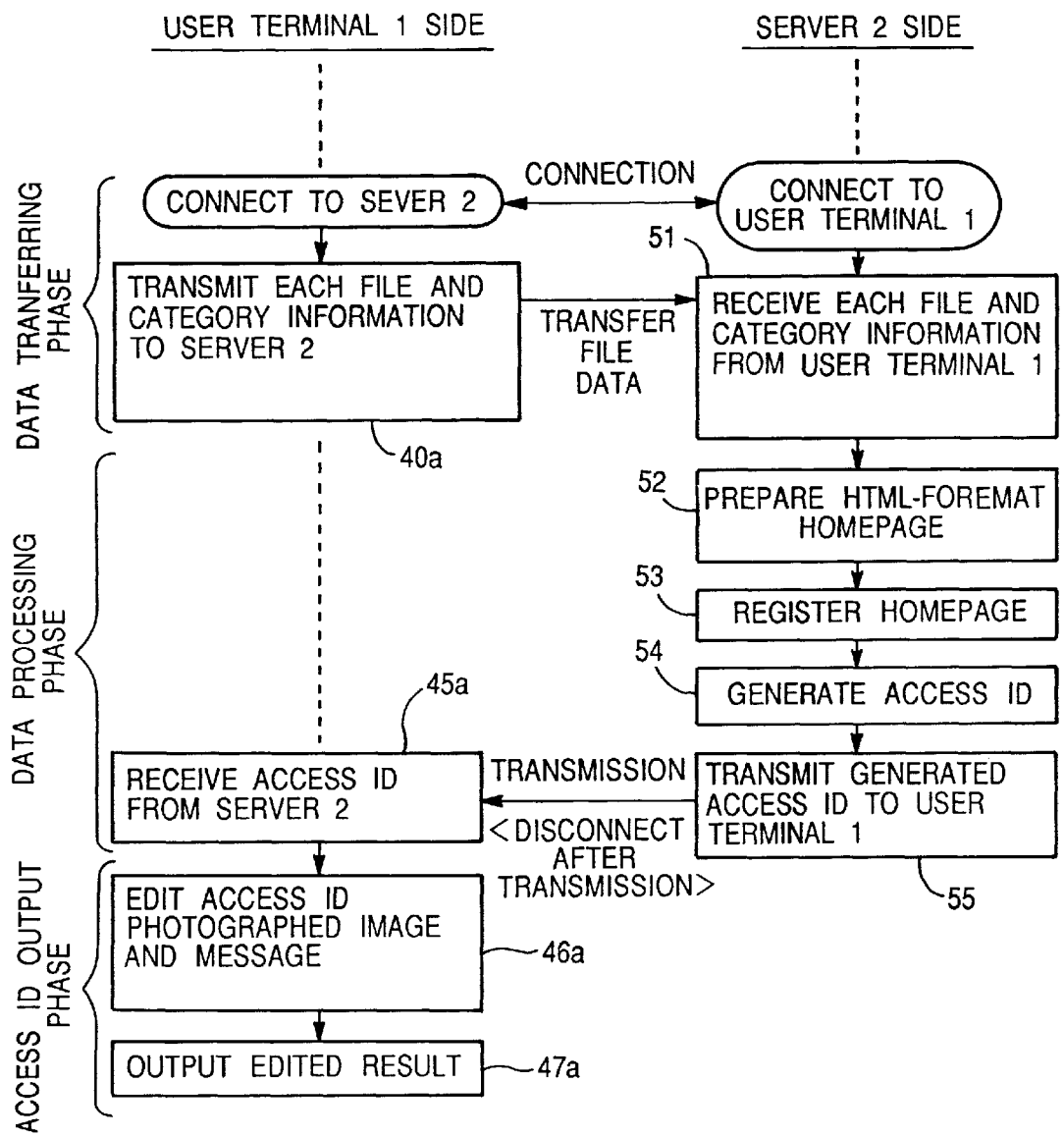
FIG. 7 is a flow chart which illustrates an example of the flow of other homepage editing and preparation processes.

Although the flow of the processes in the case where the user terminal 1 changes the edited and prepared to the HTML-format (step 39) in order to be WWW-compatible is illustrated in FIG. 4, the flow of the processes in the case where the homepage which is edited and prepared by the user terminal 1 is changed, by the server 2, to the HTML-format in order to be WWW-compatible is explained below. In FIG. 7, the idling phase, the photographing phase, and the message editing phase would be identical to that illustrated in FIG. 4 and, consequently, are omitted from the diagram. Thus, only the flow of the following processes of the data transferring phase, the data processing phase, and the access ID output phase are illustrated there. Further, the above access ID output phase corresponds to the URL output phase appearing in FIG. 4.

Data Transferring Phase

The data transferring phase connects to the server 2 with the ISDN and transmits (step 40a) the file of the photographic image taken at step 36 of FIG. 4, the files containing the message, names and such inputted and/or selected at step 38, and the category information selected at step 37.

Meanwhile, the server 2, after connecting to user terminal 1, receives each file and the category information from the user terminal 1 and stores that in a prescribed directory of the homepage accumulation section 27 by means of the homepage registration processing section 24 (step 51). At this point, the filenames transmitted from the user terminal 1 and the directories storing the corresponding files are selected and stored as text information, apart from the files.

Data Processing Phase

Here, the HTML-format homepage is prepared using each received file and the category information (step 52). This step, performed by the processing section 26, will be explained in detail with the aid of FIG. 8.

A title of the homepage corresponding to the category information is selected and the HTML is generated (step 52a). The title corresponding the category information is determined beforehand on the side of the server 2.

Then, the HTML regarding the background selected at step 35 in FIG. 4 is generated (step 52b). Further, it is possible to select a category instead of a background at step 35 of FIG. 4 and to create a background based on that category information. Also, in such a case, the background corresponding to the category information is defined beforehand on the side of the server 2.

Next, the character layout of the document of the text file corresponding to the category is selected, and in conjunction with the generation of the HTML, the information of the directory containing the text file and filename of the text file is interlinked, and the HTML including the link addresses is generated (step 52c). Further, the "text file" recited here is the file which stores the message and name inputted and/or selected in step 38 of FIG. 4.

Next, the information of the directory containing the image file and the filename of the image file is interlinked, and the HTML including the link addresses is generated (step 52d). Further, the "image file" recited here is the file concerning the photographic image taken at step 36 of FIG. 4.

Next, the information of the directory containing the voice file and the filename of the voice file is interlinked, and the HTML including the link addresses is generated (step 52e). Further, the "voice file" recited here is the file concerning the voice recorded in conjunction with the above photographing at step 36 of FIG. 4.

By means of the above-mentioned steps, the homepage data prepared in the HTML-format is stored in a prescribed directory (step 52f).

The above explanation refers to the case in which the directory where the document, image, and voice files are stored are known beforehand; however, in the case where the directory containing the document, image, and voice files to be linked are not known, the following processes will be executed.

Figure 8:
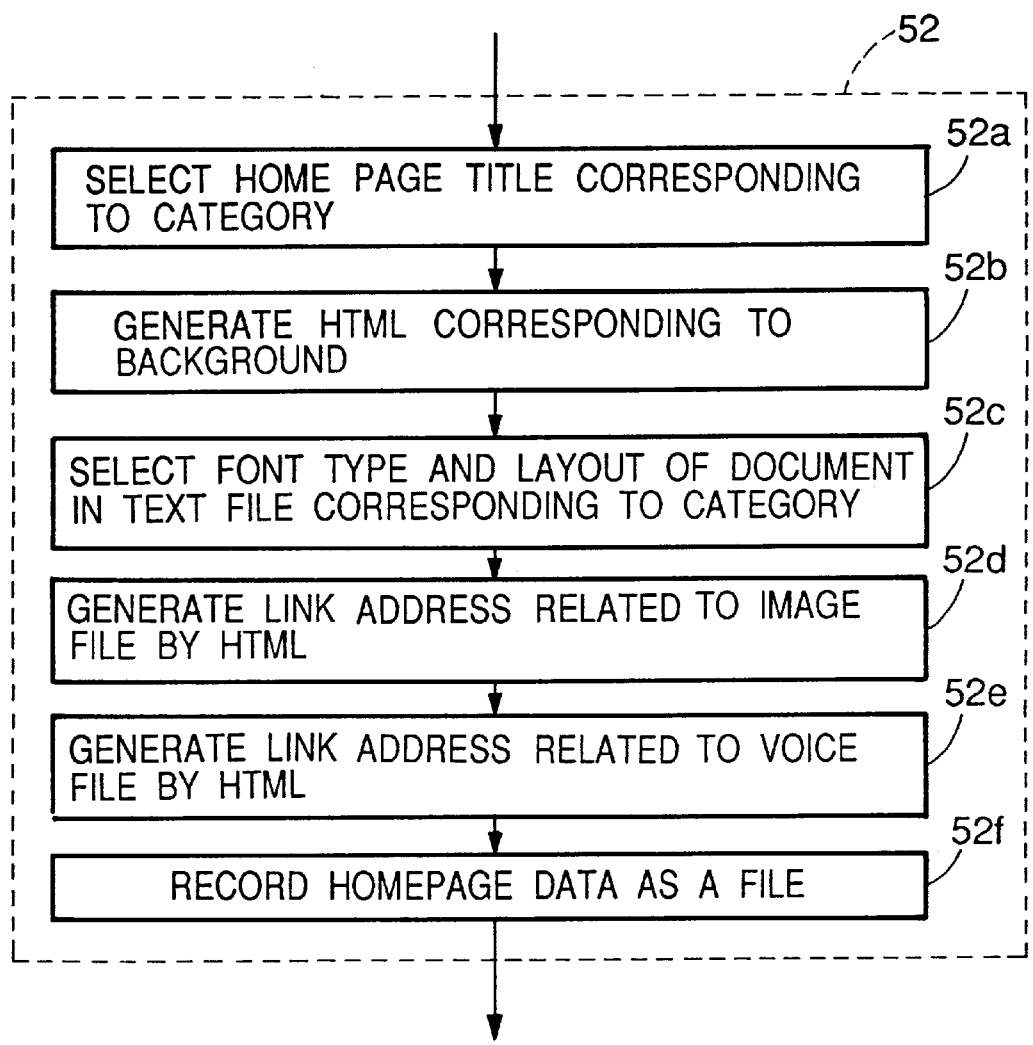
FIG. 8 is a flow chart which illustrates the flow of the detailed processes of preparing a HTML-format homepage represented in FIG. 7.

In the steps 52c through 52e of FIG. 8, the link addresses are generated in the HTML-format having the directory containing the document, the image file, the voice file be the same as the directory containing the file of the homepage prepared in the HTML-format.

Then, a comparison is made between the directory containing the document, image, and voice files and the directory containing file of the homepage prepared in the HTML-format in step 52f of FIG. 8.

In the case where the stored directories differ, the directory containing the homepage file is used as a base from which the directories containing the document, image, and voice files are searched and the relative directories are obtained. Then, utilizing the information of the relative directories which are obtained, corrections are made to the link addresses of the document, image, and voice files contained in the homepage file, after which the homepage file is stored once again.

Incidentally, oftentimes the directories containing the document, the image, and the voice files is in a deep location. That is to say, those directories are stored in locations which traverse multiple directories from the root directory. However, the directories containing the document, the image, and the voice files and the directory containing the homepage even if different, are usually rather close in proximity. Consequently, in the case where the stored directories are different, using the directory containing the homepage as a base, the relative directories containing the document, the image, and the voice files can be obtained, and with appropriate corrections, the length of the character string containing the link addresses can be made short.

As explained above, when determining the link addresses of the document, the image, and the voice files to be included in the homepage, it is possible to have the files in the same directory or in different directories.

Next, the registration of the prepared homepage is carried out by the processing section 26 as illustrated in FIG. 7 (step 53). The details of the process will be explained with the aid of FIGS. 9 through 12.

First, the examples of the pages offered by the server 2 will be explained using FIGS. 10 through 12. FIG. 10 is the front page which is offered by the server 2, and it prepares a page where a search based on categories such as "Self-Introduction Section" or "What's New Section" and a search of the "Registration List" can be selected.

Next, if the "Registration List" 61 is selected, then the top page which is the Registration List Page is displayed as illustrated in FIG. 11. At this point, if proceeding to a registered homepage is desired by use of the user terminal 1, then it is possible to proceed to the corresponding homepage by pressing a button corresponding to the desired homepage, for example, the button 64.

Similarly, in FIG. 10, if the "Self-Introduction Section" 62 is selected, then the Self-Introduction Section Page which is a page classified based on category is displayed as illustrated in FIG. 12. At this point, if proceeding to a registered homepage is desired by use of the user terminal 1, then it is possible to proceed to the corresponding homepage by pressing a button corresponding to the desired homepage, for example, the button 63.

Accordingly, in the case where a new homepage is to be registered, corrections must be made to the top page which is the Registration List Page in FIG. 11 and the pages classified based on categories.

Figure 9:
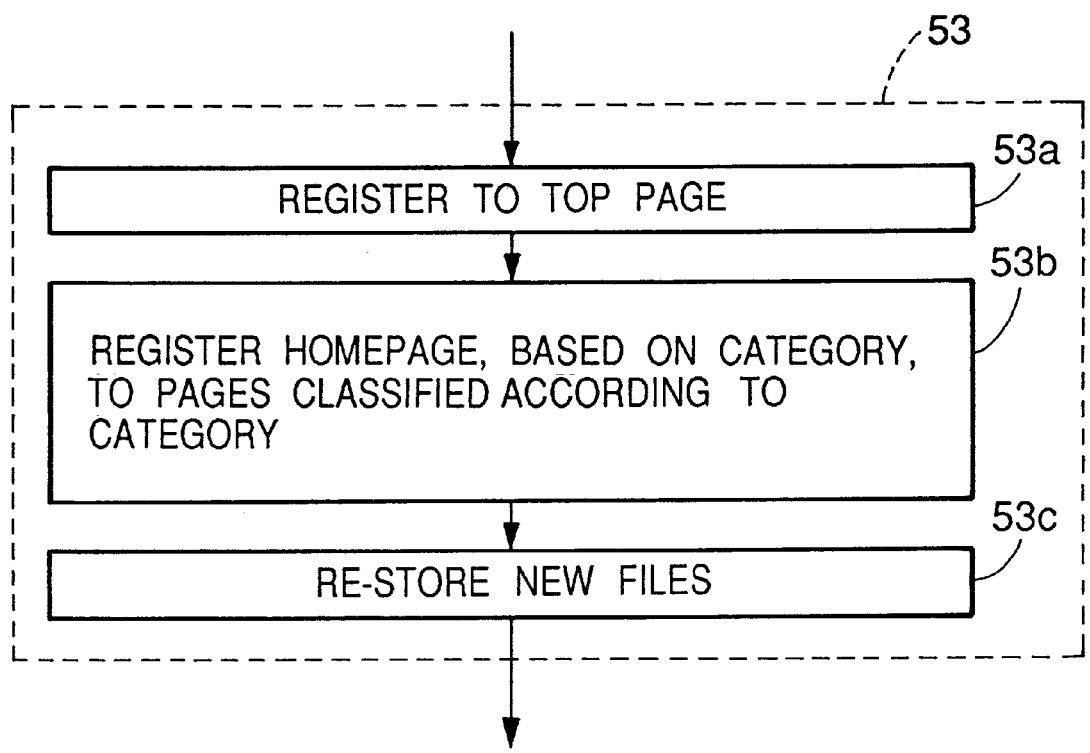
FIG. 9 is a flow chart which illustrates the flow of the detailed processes of registering the homepage data represented in FIG. 7.

Such is the case when a registration to the top page which is the Registration List Page is made as illustrated in FIG. 9 (step 53a). Registration to a top page involves reading the file containing that page and, in conjunction with, generating with HTML the indexes of the category, name, and such which are homepage data necessary for registering in the list, generating with HTML the link addresses utilizing the filename of the homepage and the directory name containing the files.

Next, the registration to the pages classified based on category is carried out according to the category information (step 53b). Registration to the category-based pages involves reading the file containing that page and, in conjunction with, generating with HTML the indexes of the name, message, and such which are homepage data necessary for registering in the list, generating with HTML the link addresses utilizing the filename of the homepage and the directory name containing the files.

Then, the corrected files of the top page and the category-based pages are stored once again (step 53c).

Next, generation of the access ID as illustrated in FIG. 7 is performed by the URL registration management section 25 (step 54). Those persons who can view the registered homepages from the user terminals 1 such as that illustrated in FIG. 6, can input a message in the space provided with the reference number 70. Then, access ID's are generated to allow those persons who register their homepages through the user terminals 1 to view the inputted messages. That is to say, the inputted messages can only be viewed by entering this access ID.

This access ID is automatically generated from the character strings of the filename of the homepage and the stored directories by the server 2. Consequently, the filename of the homepage and the stored directories can be determined at once from the access ID. Therefore, there is no need to remember the stored directories of the homepage, the filename of the homepage, and the access ID with any particular association.

In addition to the access ID, a password can also be generated.

Lastly, the processes of the server 2 (step 55, step 45a) are completed after transferring the defined access ID to the user terminals 1. At this point, the password is also transmitted in the case where a password is generated. In addition to the above, the URL can also be generated and transmitted. Then, information concerning the addresses of the homepages registered with the access ID, the password, and the URL is obtained.

Access ID Output Phase

The URL output section 19e edits and outputs, at the user terminal 1, the access ID sent from the server 2, the photograph taken previously, and inputted message. The access ID will be in a sticker-form so that it can be attached to business cards and such (step 46a, 47a). Further, in the case where the password and the URL are transmitted, these information are also outputted.

As explained above, the homepage registration and the HTML conversion for the compatibility with WWW based on the category information and the homepage data such as the document, the image, and the voice files are carried out on the side of the server 2.

In this manner, the homepage registered from the user terminal 1 to the server 2 can be read from all the terminals of personal computers and such connected to the Internet as illustrated in FIG. 1.

Further, after a prescribed amount of time passes after receiving and registering the homepage data from the user terminal 1, the server 2 deletes the data concerning the stored homepage data. Also, at the same time, the deletion of the indexes of the prescribed pages registered in step 43 of FIG. 4 or in step 53 of FIG. 7 and the deletion of the information concerning the links for the purpose of accessing the homepage data from the above indexes occurs. When a prescribed amount of time passes as such, the stored homepage is deleted and this is due to the storage capacity of the homepage accumulation section 27 illustrated in FIG. 1 being limited, thereby making it is necessary to delete the old homepage data in order to secure storage area in the homepage accumulation section 27 for the homepage data newly accumulated.

In addition, although is it desirable to have the ISDN network used in the connection between the user terminal 1 and the server 2 as in FIG. 1, it is not limiting.

Additionally, it is possible to store the program to execute the demonstration display section 19a, the photographing section 19b, the message editing section 19c, the data transferring section 19d, and the URL output section 19e at the user terminal onto a computer-readable recording medium, to have this recording medium be read by a computer, and to conduct interactive multimedia information input at the user terminal 1 by means of executing the above program. Furthermore, it is possible to store the program to execute the homepage registration processing section 24, the URL registration management section 25, and the processing section 26 at the server 2 onto a computer-readable recording medium, to have this recording medium be read by a computer, and to execute the actions of the server 2 by means of executing the latter program.

What is claimed is:

1. A method for preparing and registering homepages within a system that connects a plurality of user terminals with a server equipped by a service provider comprising the steps at said user terminals:

preparing homepage data relating to contents, which constitutes a fixed-form homepage, by the steps of selecting a background of a homepage, inputting a photographed image from a camera provided by the user terminal, inputting a message, and selecting or inputting a name;

transmitting the homepage data to above server; and receiving an access ID which is used only for viewing messages input by others to the homepage registered at the server, from said server; and outputting information including said access ID, on paper, and comprising the steps at said server of:

receiving said homepage data from said user terminals;

storing said homepage data in a recording apparatus;

converting said homepage data to HTML for creating and registering the fixed-form homepage with the selected or inputted contents, including capability of inputting a message to said converted homepage;

determining said access ID; and returning said access ID to said user terminals, which have transmitted beforehand said homepage data.

2. A method for preparing and registering homepages according to claim 1 further comprising the steps at said user terminals of:

determining a category from categories which have been prepared for categorizing registered homepages at said server;

and further comprising the steps at said server of:

receiving said homepage data and said category; and categorizing and storing said homepage data in said recording medium based on said category.

3. A method for preparing and registering homepages according to claim 2, further comprising the step of performing at said server, a HTML conversion in order to have compatibility with WWW by linking the layout setup based on said category with the homepages stored in said recording medium.

4. A method for preparing and registering homepages according to claim 1 or 2 further comprising the steps at said server of:

registering an index of said homepage to a prescribed page; and linking said index with said stored homepage data.

5. A method for preparing and registering homepages according to claim 4, further comprising the steps at said server when a prescribed amount of time passes after registering said index to a prescribed page of:

deleting said stored homepage data; and deleting the index of said deleted homepage from said prescribed page.

6. A method for preparing and registering homepages according to claim 1, wherein said message input capability is an area for inputting a message on the homepage.

7. A method in accordance with claim 1, further comprising the step at said server of:

transmitting a URL of said homepage to said user terminals, which have transmitted said homepage data beforehand, and further comprising the steps at said user terminals of:

receiving said URL from said server; and outputting said URL on paper.

8. A method according to claim 7, wherein said user terminals include a money insertion apparatus, and wherein the steps at said user terminals start in response to inserting money in said money insertion apparatus.

9. A method for preparing and registering homepages according to claim 1, wherein said user terminals include a money insertion apparatus, and wherein the steps at said user terminals start in response to inserting money in said money insertion apparatus.

10. A system for preparing and registering homepages that connects a plurality of user terminals with a server equipped on the side of a service provider, comprising at said user terminals:

> means for preparing homepage data relating to contents, which constitutes a fixed-form homepage, by the steps of selecting a background of a homepage, inputting a photographed image from a camera provided by the user terminal, inputting a message, and selecting or inputting a name;
>
> means for transmitting the prepared homepage data to the server;
>
> means for receiving information, including an access ID which is used only for viewing messages input by others to homepage registered at the server, transmitted by the server; and
>
> means for outputting the information, including the access ID, onto paper;

and comprising at said server:

> means for receiving the homepage data from the user terminals;
>
> means for registering and storing the homepage data in a recording medium;
>
> means for converting the homepage data to HTML for creating and registering the fixed-form homepage with the selected or inputted contents;
>
> means for inputting a message related to the converted homepage data;
>
> means for determining the access ID; and
>
> means for returning information, including the access ID, to the user terminals.

11. A system for preparing and registering homepages in accordance with claim 10, wherein:

> said means for preparing homepages includes means for determining a category from categories which have been prepared for categorizing registered homepages beforehand;
>
> said means for transmitting transmits, to said server, said category in addition to the prepared homepage data;
>
> said means for receiving receives from said user terminals, said category in addition to said homepage data; and
>
> said means for registering homepages includes:
> > means for categorizing said homepage data; and
> > means for storeing in said recording medium said homepage data classified based on said category.

12. A system for preparing and registering homepages in accordance with claim 11, wherein said server further provides a means for a HTML conversion in order to have compatibility with WWW by linking the layout setup based on said category with the homepages stored in said recording medium.

13. A system for preparing and registering homepages according to claim 10 or 11, with said server further including:

> means for performing the registration of the index of said homepages to a prescribed page; and
>
> means for conducting a link between said index and said stored homepage data.

14. A system for preparing and registering homepages in accordance with claim 13, wherein said server further includes means for deleting said stored homepage data along with the index of said deleted homepage from said prescribed page when a prescribed amount of time passes after said index is registered to a prescribed page.

15. A system for preparing and registering homepages according to claim 10, wherein said means for inputting a message is an area for inputting a message on the homepage.

16. A system for preparing and registering homepages in accordance with claim 10, further comprising, at said server:

> a means for transmitting a URL of said homepage to said user terminals; and further comprising at said user terminals:
>
> a means for receiving said URL from said server; and
>
> a means for outputting said URL on paper.

17. A system according to claim 8 or claim 16, wherein said user terminals further include:

> money insertion means for enabling operation of the system when money is inserted.

18. An interactive input apparatus for multimedia information connected to a server equipped on the side of a service provider, comprising:

> means for preparing homepage data relating to contents, which constitutes a fixed-form homepage, by the steps of selecting a background of a homepage, inputting a photographed image from a camera provided by the user terminal, inputting a message, and selecting or inputting a name;
>
> means for transmitting the homepage data to the server;
>
> means for receiving information, including an access ID which is used only for viewing messages input by others to the homepage registered at the server, from the server; and
>
> means for outputting information including the access ID, onto paper.

19. An interactive input apparatus for multimedia information in accordance with claim 18, wherein:

> said means for preparing homepages includes means for determining a category from categories which have been prepared for categorizing registered homepages beforehand; and
>
> said means for transmitting transmits, to said server, said category in addition to the prepared homepage data.

20. An interactive input apparatus for multimedia informations according to claim 18 or 19, further providing a means for a HTML conversion in order to have said edited and prepared homepages be compatible with WWW.

21. An interactive input apparatus for multimedia information in accordance with claim 18, further comprising:

> means for receiving a URL from said server; and
>
> means for outputting said URL on paper.

22. An interactive input apparatus according to claim 18 or claim 21, further comprising:

> money insertion means for enabling operation of the apparatus when money is inserted.

23. A computer program product containing a computer readable program for causing a computer connected to a server on the side of a service provider to register information concerning prepared homepages at the server, said program performing the processes of:

> preparing homepage data relating to contents which constitutes a fixed-form homepage, by the steps of selecting a background of a homepage inputting a photographed image from a camera provided by the user terminal inputting a message, and selecting or inputting a name;
>
> transmitting the prepared homepage data to the server;
>
> receiving information, including an access ID which is used only for viewing messages input by others relating to said homepage, from said server; and outputting information, including said access ID, onto paper.

24. A computer program product in accordance with claim 23, wherein:
  editing and preparing homepages includes determining a category for the homepage data from categories which have been prepared for categorizing registered homepages beforehand; and
  transmitting the homepage data to said server includes transmitting said category in addition to the prepared homepage data.

25. A computer program product according to claim 23, further effecting the process of adding an area for message input to the prepared homepage, before the homepage is transmitted to the server.

26. A computer program product in accordance with claim 23, further comprising the processes of:
  receiving a URL from said server; and
  outputting said URL on paper.

27. A computer program product according to claim 23 or claim 26, further comprising:
  enabling operation of the program when money is inserted in a money insertion apparatus.

* * * * *